United States Patent [19]

Kapoor et al.

[11] Patent Number: 5,925,326

[45] Date of Patent: *Jul. 20, 1999

[54] PROCESS FOR THE PRODUCTION OF HIGH PURITY CARBON DIOXIDE

[75] Inventors: Akhilesh Kapoor, South Orange; Carl Schatz, East Windsor, both of N.J.

[73] Assignee: The Boc Group, Inc., Murray Hill, N.J.

[ * ] Notice: This patent is subject to a terminal disclaimer.

[21] Appl. No.: 08/925,445

[22] Filed: Sep. 8, 1997

Related U.S. Application Data

[62] Division of application No. 08/518,380, Aug. 23, 1995.

[51] Int. Cl.$^6$ ............................ B01D 47/00; B01D 50/00; B01J 8/02; B01J 8/00

[52] U.S. Cl. ........................ 423/220; 423/212; 423/213.2; 423/235; 423/236; 423/237; 423/239.1; 423/351; 423/415.1; 422/169; 422/172

[58] Field of Search .............................. 423/212, 213.2, 423/236, 237, 239.1, 235, 415.1, 351; 422/169, 172

[56] References Cited

U.S. PATENT DOCUMENTS

| | | | |
|---|---|---|---|
| 3,886,260 | 5/1975 | Unland ................................. | 423/213.5 |
| 3,976,745 | 8/1976 | Nakajima et al. ...................... | 423/239 |
| 4,039,622 | 8/1977 | Murrell et al. ......................... | 423/239 |
| 4,081,511 | 3/1978 | Laue et al. ........................... | 423/239 A |
| 4,087,250 | 5/1978 | Laue et al. ............................ | 23/262 |
| 4,626,417 | 12/1986 | Young ................................. | 423/235 |
| 4,666,882 | 5/1987 | Okazaki et al. ...................... | 502/338 |
| 4,735,930 | 4/1988 | Gerdes et al. .......................... | 502/78 |
| 4,777,024 | 10/1988 | Epperly et al. ........................ | 423/235 |
| 5,047,220 | 9/1991 | Polcer ................................. | 423/239 |
| 5,137,703 | 8/1992 | Lichtin et al. ......................... | 423/239 |
| 5,139,754 | 8/1992 | Luftglass et al. ...................... | 423/235 |
| 5,286,467 | 2/1994 | Sun et al. ............................. | 423/239.1 |
| 5,294,409 | 3/1994 | Cohen et al. .......................... | 422/169 |
| 5,523,068 | 6/1996 | Yang et al. ........................... | 423/239.1 |
| 5,612,010 | 3/1997 | Pandley et al. ........................ | 423/239.1 |
| 5,743,929 | 4/1998 | Kapoort et al. ........................ | 65/134.6 |

Primary Examiner—Gary P. Straub
Assistant Examiner—Cam N. Nguyen
Attorney, Agent, or Firm—Coleman R. Reap; Salvatore P. Pace

[57] ABSTRACT

Food grade carbon dioxide is produced from oxyfuel fired glassmaking furnace waste gas by a series of steps including quenching the waste gas with aqueous quench liquid, dry-filtering sulfur salt from the gas, scrubbing the filtered gas with aqueous carbonate to convert the remaining sulfur dioxide to an aqueous sulfite suspension and using the suspension as part or all of the above-mentioned aqueous quench liquid, contacting the sulfur dioxide-free waste gas with ammonia in the presence of a catalyst that selectively converts nitrogen oxides to nitrogen, thereby removing substantially all nitrogen oxides from the waste gas, and distilling the resulting waste gas stream thereby producing high purity liquid carbon dioxide and producing an off-gas, which is recycled to the furnace as fuel.

3 Claims, 3 Drawing Sheets

PROCESS FOR THE PRODUCTION OF HIGH PURITY CARBON DIOXIDE

This is a division of application Ser. No. 08/518,380 filed Aug. 23, 1995.

FIELD OF THE INVENTION

This invention relates to the production of high purity carbon dioxide, and more particularly to the recovery and purification of carbon dioxide from the waste gas of a glassmaking furnace.

BACKGROUND OF THE INVENTION

Glass is commonly manufactured by melting batch materials and crushed cullet at very high temperatures (upwards of 1500° C.) using electric-assisted natural gas- or fuel oil-fired furnaces. Traditionally, air was widely used as the oxidant in such furnaces, because of its ready availability and low cost. A significant disadvantage associated with the use of air in industrial furnaces is the high concentration of nitrogen oxides ($NO_x$) that are produced in the furnaces and released into the atmosphere.

In recent years, with the passage of stringent environmental laws and regulations, industry has been required to find alternatives to processes that result in the release of large quantities of gaseous pollutants to the atmosphere. In the glassmaking industry the amount of $NO_x$ released to the environment can be considerably lessened by the use of oxygen or oxygen-enriched air as the oxidant in glassmaking furnaces. Among the many U.S. patents that discuss the use of oxygen or oxygen-enriched air as the oxidant in glassmaking furnaces are U.S. Pat. Nos. 3,337,324, 3,592,622, 3,592,623 and 3,627,504.

A potential advantage of using oxygen or oxygen-enriched air in glassmaking furnaces is the opportunity to produce high purity carbon dioxide from the furnace exhaust gas. When oxygen-enriched air or substantially pure oxygen is used as the oxidant, the exhaust gas usually contains about 30 to 50% carbon dioxide, about 40 to 60% water vapor, and only 0 to about 3% each of oxygen, argon and nitrogen. Thus, the gas is a good source of carbon dioxide. However, the exhaust gas also contains about 500 to 3500 ppm $NO_x$ and about 500 to 1000 ppm sulfur oxides ($SO_x$). These impurities, together with residual particulate impurities, such as sulfur salts, must be substantially completely eliminated from the gas in order for the gas to meet the standards set for high purity carbon dioxide. For example, food grade carbon dioxide should not contain more than 5 ppm $NO_x$ or more than 1 ppm sulfur compounds. Unfortunately, there are currently no commercial scale cost-effective methods of reducing $NO_x$ and $SO_x$ in gas streams to these levels.

U.S. Pat. No. 4,806,320, discloses the reduction of $NO_x$ in flue gases by mixing ammonia or methane with the flue gas and passing it through a bed of vermiculite. This patent discusses the disclosures of several prior art patents, such as U.S. Pat. Nos. 3,118,727 and 3,806,582, which teach mixing methane with waste gases to reduce the concentration of $NO_x$ in the waste gases; U.S. Pat. Nos. 3,864,451 and 3,008,796, which teach the reduction of $NO_x$ in flue gases by mixing ammonia with the flue gas and contacting a catalyst with the mixture; and U.S. Pat. No. 3,880,618, which teaches the removal of both $NO_x$ and $SO_x$ from flue gas by passing the gas over an alkali metal carbonate, such as sodium carbonate. The above processes are somewhat successful for the removal of $NO_x$ and $SO_x$ from flue gases, but are not always satisfactory for reducing $NO_x$ concentration in flue gases to the levels required under the current stringent environmental regulations and to meet standards set for food-grade carbon dioxide purity.

U.S. Pat. No. 5,149,512 discusses the reduction of $NO_x$ in flue gases by a technique known as Selective Catalyst Reduction (SCR), which involves mixing ammonia with a flue gas and passing the mixture over a catalyst. Also disclosed in this patent is a modified SCR process in which a mixture of a hydrocarbon, such as methane, and flue gas is passed over aluminum-supported platinum, palladium or rhodium catalysts.

Although the above-discussed patents disclose processes for reducing one or more pollutants from flue gases, none of these references disclose processes which efficiently and inexpensively reduce all of the impurities contained in glassmaking furnace flue gas to levels set by the Environmental Protection Agency, and at the same time produce food grade carbon dioxide. The present invention provides a method of more efficiently removing $NO_x$, $SO_x$ and particulates from oxyfuel-fired glassmaking furnaces than is done in prior art processes, while at the same time producing carbon dioxide which meets food grade standards.

SUMMARY OF THE INVENTION

The invention is practiced by melting glass in an oxyfuel-fired furnace, thereby producing molten glass and a hot carbon dioxide rich furnace waste gas stream which contains various impurities, including $SO_2$ and $NO_x$. The hot exhaust gas is first treated to convert the $SO_2$ to sulfur salts which are recycled to the furnace, and then treated to convert the $NO_x$ to nitrogen. The nitrogen and any remaining gaseous impurities are then removed from the product stream, thereby producing substantially pure carbon dioxide as a product of the process.

According to one embodiment of the invention, glass batch and crushed cullet are heated in an oxyfuel-fired glassmaking furnace zone by combusting a hydrocarbon fuel with high purity oxygen or oxygen-enriched air, thereby producing molten glass and a hot gaseous waste gas stream. The waste gas stream is discharged from the furnace and quenched with an aqueous quench solution which contains a carbonate in a concentration such that the pH of the solution is in the range of about 6.5 to 8. The waste gas stream is cooled and at least part of the $SO_2$ contained in the stream is converted to sulfur salts. The cooled waste gas stream next enters a filtration zone in which sulfur salts and other particulate solids are filtered from the gas stream. The filtered solids are recycled to the furnace zone.

In a refinement of the above-described first embodiment, the gas stream exiting the filtration zone passes through a gas scrubbing zone, wherein it is contacted with additional aqueous solution of one or more carbonates, thereby converting any remaining $SO_2$ to sulfur salts. In a preferred aspect of this refinement, the carbonate is introduced into the scrubber in a stoichiometric excess, relative to the quantity of $SO_2$ present in the gas stream exiting the filtration zone, and at least part of the sulfur salts, in aqueous suspension, together with unreacted carbonate, are recycled to the hot waste gas exiting the furnace zone for use as the aqueous quench solution.

In a preferred aspect of the above-described embodiments the filtration zone is a bag filter or an electrostatic precipitator, or a combination of these filtration systems.

In another preferred embodiment, the carbonates are selected from sodium carbonate, potassium carbonate, calcium carbonate and mixtures of these. In the most preferred aspect of this embodiment, the carbonate is sodium carbonate.

In another preferred embodiment the waste stream cooling step does not cool the waste gas stream to its dew point, and it is maintained above the gas dew point until after the gas leaves the filtration zone.

In another preferred embodiment, the hot waste gas is cooled with substantially pure water prior to being contacted with the above-described aqueous quench solution.

In another embodiment of the invention, the scrubbed waste gas, now substantially free of $SO_2$, is contacted with ammonia in a selective catalytic reduction zone in the presence of a catalyst selected from vanadium, titanium, tungsten, zeolites, platinum, palladium, rhodium, ruthenium, osmium, iridium or mixtures of two or more of these at a temperature in the range of about 250 to about 500° C., thereby converting $NO_x$ in the scrubbed waste gas to nitrogen. In another aspect of this embodiment of the invention, the gas stream leaving the selective catalytic reduction zone, now substantially free of both $SO_2$ and $NO_x$, is dried and subjected to cryogenic distillation, thereby producing high purity liquid carbon dioxide and a gas stream, and part of the gas stream is recycled to the glassmaking furnace zone for use as fuel.

In a preferred aspect of the invention, the selective catalytic reduction zone comprises two or more serially-connected reactors, each containing one or more of the above-mentioned catalysts and each reactor being fed with ammonia. The reactors are operated under different conditions. The temperature of the waste gas decreases and the ratio of ammonia to total nitrogen oxides in the waste gas increases as the gas passes through the series of reactors. When the selective catalytic reduction zone comprises a series of two reactors, the waste gas entering the first reactor in the series is preferably maintained at a temperature in the range of about 350 to about 500° C., and the molar ratio of ammonia to total nitrogen oxides in the waste gas in the first reactor is preferably maintained in the range of about 0.5 to 1.1. The temperature of the gas passing from the first reactor to the second reactor is preferably maintained in the range of about 250 to about 400° C., and the molar ratio of ammonia to total nitrogen oxides in this gas stream is preferably maintained in the range of about 0.75 to about 2.0. When the selective catalytic reduction zone comprises a series of three reactors, the waste gas entering the first reactor in the series is preferably maintained at a temperature in the range of about 350 to about 500° C., and the molar ratio of ammonia to total nitrogen oxides in the waste gas is preferably maintained in the range of about 0.5 to 1.1. The temperature of the gas passing from the first reactor to the second reactor is preferably maintained in the range of about 300 to about 400° C., and the molar ratio of ammonia to total nitrogen oxides in this gas stream is preferably maintained in the range of about 0.75 to about 1.5. The temperature of the gas passing from the second reactor to the third reactor is preferably maintained in the range of about 250 to about 350° C., and the molar ratio of ammonia to total nitrogen oxides in this gas is preferably maintained in the range of about 1.0 to about 2.0.

In a further aspect of this embodiment, the liquefied carbon dioxide is subjected to an adsorptive purification step using an adsorbent which selectively adsorbs nitrogen dioxide. Preferred adsorbents are zeolite 5A, zeolite 13X and mixtures of these. This removes any remaining nitrogen dioxide from the liquid carbon dioxide, thereby yielding food grade liquid carbon dioxide.

In another aspect of the invention, methane is introduced into the hot waste gas stream exiting the furnace, thereby converting some of the $NO_x$ in this stream to nitrogen.

In another preferred embodiment of the invention, the hot waste gas exiting the furnace is heat exchanged with the scrubbed gas exiting the scrubbing unit prior to introduction of the scrubbed gas into the selective catalytic reduction system.

In another aspect of the invention, the hot purified gas exiting the selective catalytic reduction system is heat exchanged with the feed to this unit either prior to or instead of heat exchange between the furnace waste gas and the gaseous effluent from the scrubber.

DETAILED DESCRIPTION OF THE INVENTION

Figure 1:
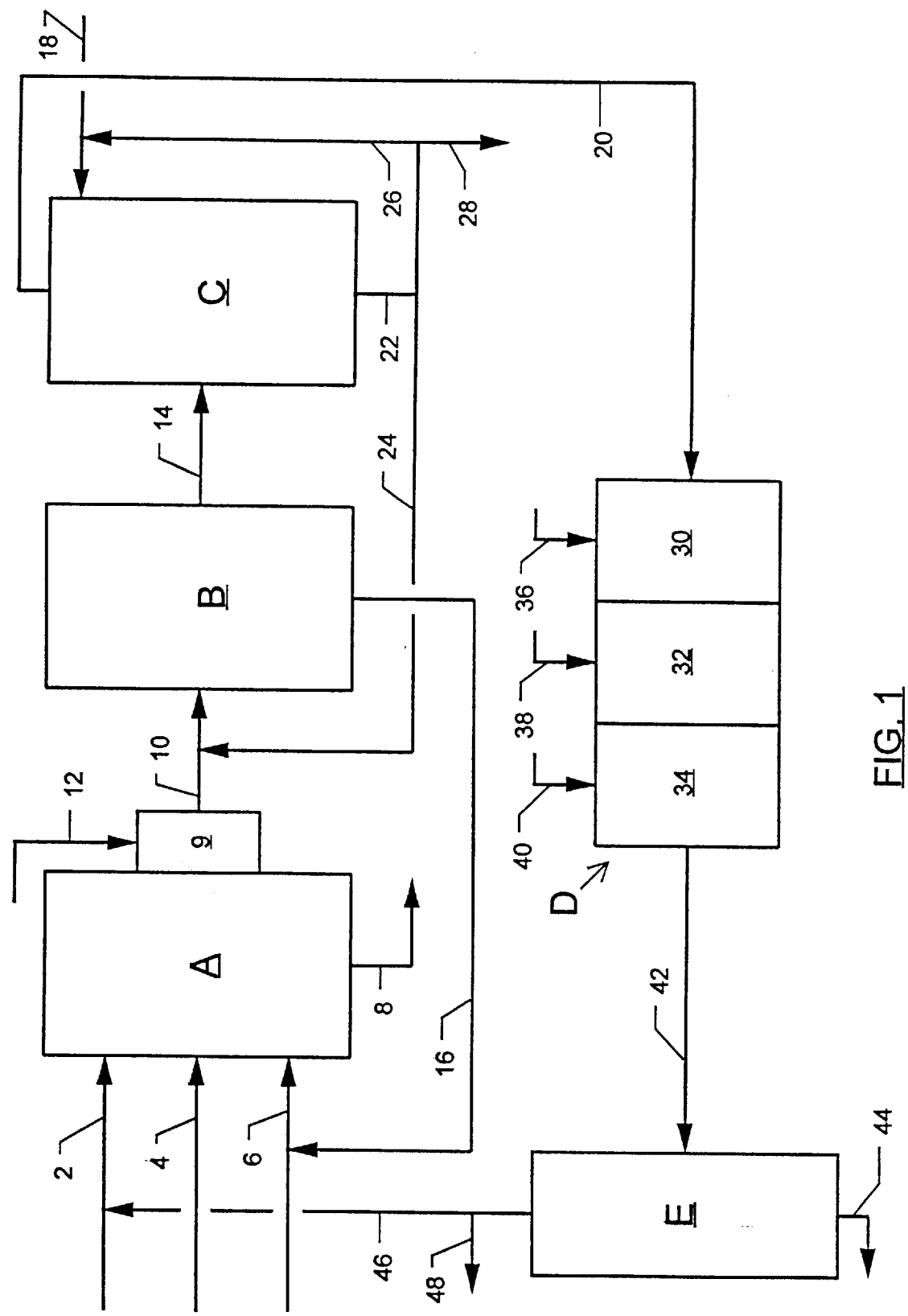
FIG. 1 is a schematic representation of a first embodiment of the invention.

As used herein, the term "oxygen-enriched air" means air that contains at least 30 volume % oxygen, the term "high purity oxygen" means a gas that contains at least 90 volume % oxygen, and an oxyfuel-fired furnace is one that uses oxygen-enriched air or high purity oxygen as the oxidant.

The invention can be employed with any oxyfuel-fired glassmaking furnace, but is particularly adapted for use in a glassmaking furnace in which high purity oxygen containing at least 90 and preferably at least 93% oxygen is used as the oxidant, since this permits the furnace to be more efficiently heated and reduces the amount of nitrogen that must be eliminated in the gas recovery operations.

The invention simplifies the removal of noxious substances from waste gas streams from glassmaking furnaces, and provides a convenient method of producing high purity carbon dioxide, i.e. food grade carbon dioxide. By virtue of the invention sulfur dioxide is removed from the waste gas by conversion to sulfur salts, which are recycled to the furnace as useful additives to the glass formulation together with other solid particulates that are removed from the waste gas, and nitrogen oxides are converted to nitrogen, which can be released to the environment.

The invention is further illustrated in the attached drawing figures. Various flow lines have been included in the figures as an aid to the explanation of the several aspects of the invention. Associated processing equipment, valves, gages, etc., that are not directly related to the invention and which are not necessary for an understanding of the invention have been omitted from the figures for the sake of simplicity. The same reference numerals are used to represent the same or similar parts in the various figures.

Turning now to the embodiment of FIG. 1, there is shown therein an oxyfuel glassmaking furnace and a waste gas purification system. The major equipment units illustrated in FIG. 1 are glassmaking furnace A, waste gas filtration system B, $SO_x$ scrubbing unit C, $NO_x$ reduction plant D and $CO_2$ distillation unit E. Units A, B, C and E are all conventional units, and details of their design, construction and operation form no part of the present invention.

Glassmaking furnace A can be any of the various oxyfuel-fired furnaces used for glass manufacture. Furnace A is provided with fuel supply line 2, oxidant feed line 4, glass batch and cullet feed line 6, melted glass outlet 8 and waste gas cooling chamber 9, which is connected to waste gas line 10. Connected to cooling chamber 9 is a fresh water supply line, 12. Line 10 is connected to the inlet of filtration system B.

Filtration system B can be any type of bag filter or electrostatic precipitator designed to collect solid particles from a gas stream and periodically or continuously discharge the particles from the filtering system. Filtration system B is provided with filtered waste gas line 14, which is connected to the inlet end of scrubbing unit C, and filtered particulates recycle line 16, which, in the illustrated embodiment, is depicted as connected to glass batch and cullet feed line 6.

Scrubber C is any liquid gas-scrubbing system suitable for scrubbing $SO_2$-containing gases with an aqueous carbonate solution, and is preferably one which provides intimate contact with the gas to convert in a single pass substantially all of the $SO_2$ contained in the gas to sulfite. Scrubber C is provided with aqueous carbonate solution feed line 18, scrubbed gas discharge line 20 and sulfur salt discharge line 22, the latter of which is connected to aqueous quench line 24 and recycle line 26. Line 24 is connected on its downstream end to waste gas line 10. In the illustrated embodiment, recycle line 26 is connected to carbonate solution feed line 18, and waste discharge line 28 is connected to recycle line 26. Scrubbed gas discharge line 20 is connected to the inlet of $NO_x$ reduction plant D.

Plant D is a selective catalytic reduction system comprised of two or more serially-connected reaction chambers, each filled with catalyst. The catalyst may be any one or more of vanadium, titanium, tungsten, zeolites, platinum, palladium, rhodium, ruthenium, osmium or iridium, and if desired, different catalyst may be used in the various units. In the illustrated embodiment, plant D is comprised of three serially-connected units, 30, 32 and 34, which are respectively provided with ammonia feed lines 36, 38 and 40. On its outlet end, plant D is provided with purified gas discharge line 42, which is connected to the inlet of unit E. Unit E is a conventional liquid carbon dioxide plant, which typically includes feed compression, drying, feed purification, condensation, distillation and carbon dioxide product purification steps.

Unit E is provided with pure liquid carbon dioxide discharge line 44 and fuel recycle line 46, the latter of which is connected to fuel supply line 2. Gas discharge line 48 connects line 46 to external combustion means.

Figure 2:
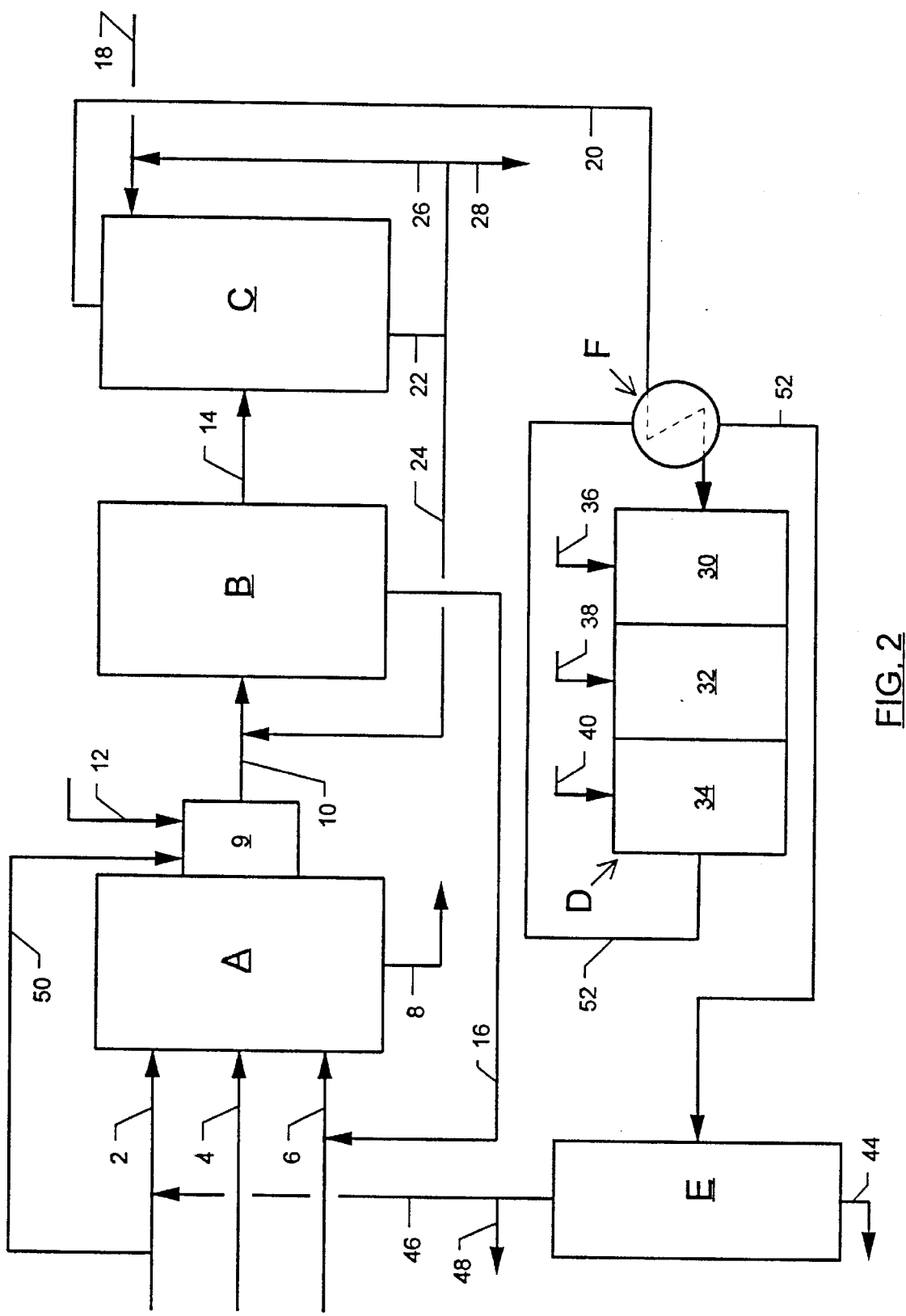
FIG. 2 is a schematic representation of a variation of the first embodiment, showing a preferred aspect of the invention.

The embodiment illustrated in FIG. 2 is a variation of the system of FIG. 1. In the system of FIG. 2, quench fuel line 50, connected to fuel supply line 2, supplies a stream of fuel to chamber 9. The system of FIG. 2 also includes heat exchanger F, which is adapted to provide heat exchange between the gas entering unit D through line 20 and gas exiting unit D through line 52. Line 52 carries cooled gas from the purified gas outlet of heat exchanger F to the feed inlet of unit E.

Figure 3:
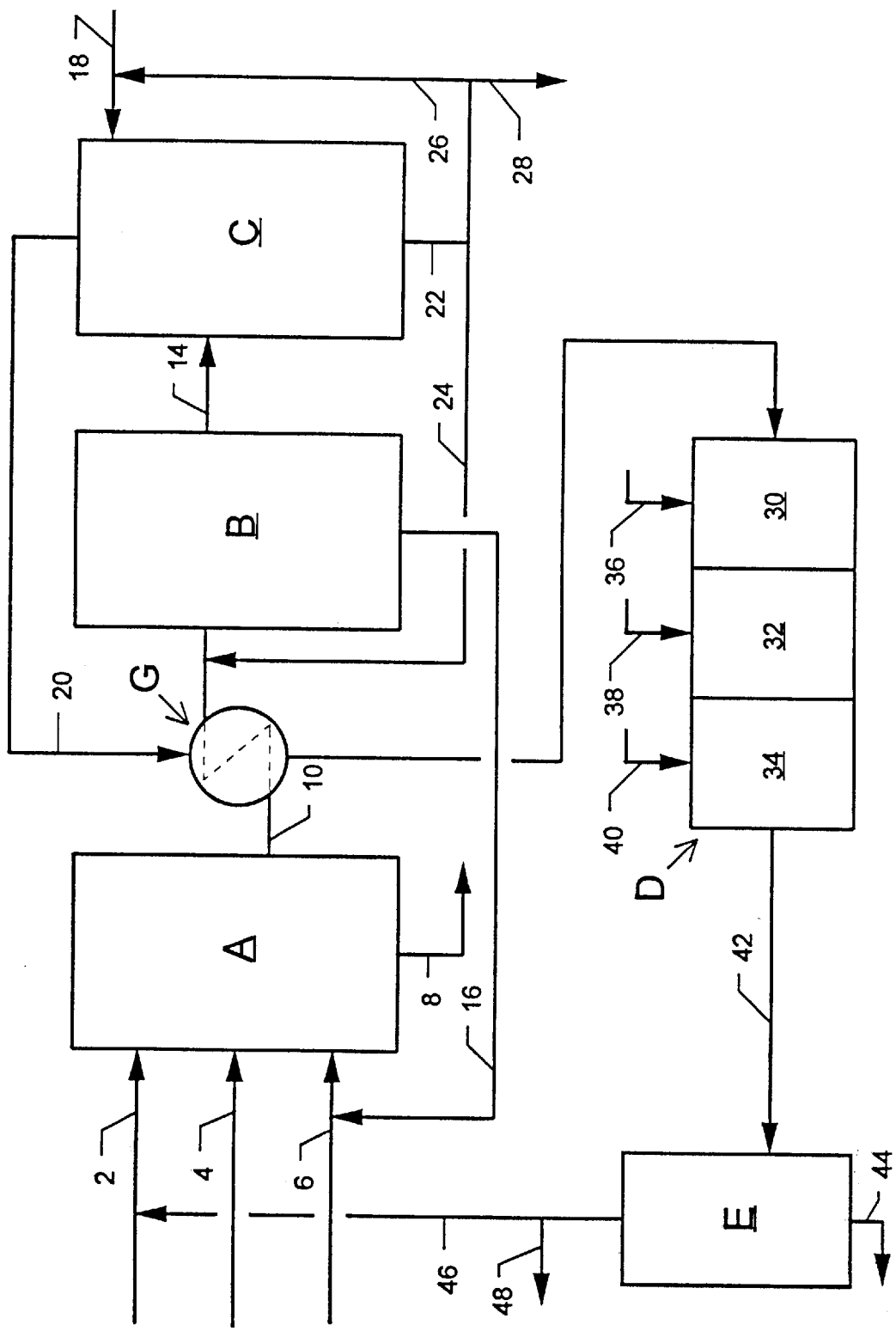
FIG. 3 is a schematic representation of a variation of the first embodiment, showing another preferred aspect of the invention.

The embodiment illustrated in FIG. 3 is another variation of the system of FIG. 1. The embodiment of FIG. 3 is similar to that of FIG. 1, except that in the FIG. 3 embodiment waste gas line 10 and scrubbed gas discharge line 20 pass through heat exchanger G before entering filtration system B and $NO_x$ reduction plant D, respectively. Waste gas cooling chamber 9 and fresh water line 12 are not shown in FIG. 3 to simplify the drawing, however it is intended that these features be included in the preferred aspect of the FIG. 3 embodiment.

In practicing the process of the invention in the embodiment illustrated in FIG. 1, glass batch raw materials are weighed and blended, and charged into furnace A through line 6, either on a batch or continuous basis. The batch includes various components, such as sand, limestone, a source of soda, such as sodium carbonate or sodium hydroxide and various other additives, including crushed cullet, glass colorants and fining agents, such as sulfates, halides, etc. The batch is heated in furnace A to temperatures of about 1300° C. or higher for a sufficient period of time to form a uniform melt. This is accomplished by combusting a gaseous or liquid hydrocarbon fuel with an oxidant, introduced into the furnace through lines 2 and 4, respectively. The fuel is preferably a hydrocarbon gas, most preferably methane or natural gas, and the oxidant is either oxygen-enriched air or high purity oxygen. The combustion may be assisted by electrodes immersed in the glass melt. Glass is melted and removed from the furnace through line 8 and is subjected to forming steps, such as molding, drawing, blowing, etc.

The hot exhaust gas exits furnace A at a temperature above about 1300° C. and next passes through waste gas cooling chamber 9, which is generally refractory-lined. This chamber serves the purpose of cooling the waste gas sufficiently to prevent the occurrence of heat damage to lines and equipment downstream of furnace A. The waste gas is preferably cooled by injecting substantially mineral-free water into the gas as it passes through chamber 9.

The waste gas leaving furnace A is comprised predominantly of carbon dioxide and water vapor, but also contains small amounts of other gaseous components, such as unreacted hydrocarbons, nitrogen oxides and sulfur dioxide, and perhaps nitrogen and argon, the concentration of the latter two components being substantially dependent upon the composition of the oxidant introduced into the furnace. The waste gas usually also contains some inorganic substances in particulate form or in vapor form which condense to form particulates.

The waste gas is next subjected to a series of purification steps, beginning with filtration to remove solid particles from the gas. The filtration is carried out in filtration system B which, as noted above comprises one or more typical solids filtration devices, such as bag filters or electrostatic precipitators. However, before being introduced into system B the gas is further quenched with an aqueous quench liquid. The purpose of this quench is to further cool the gas before it comes into contact with the filtration devices of system B; to convert some of the $SO_2$ contained in the waste gas to sulfur salts; and to introduce the sulfur salts that were produced in downstream scrubber unit C into the gas stream upstream of filtration system B, so that they may be captured and recycled to furnace A. Sulfur salts typically produced include sulfites, sulfates, sulfides, bisulfites, bisulfates, bisulfides, etc. The aqueous quench stream is introduced into the waste gas in line 10 through line 24.

The total quantity of cooling water and aqueous quench liquid introduced into the waste gas through lines 12 and 24, respectively, is preferably less than the amount that would reduce the temperature of the waste gas to its dew point. The waste gas is preferably passed through filtration system B as a dry gas to effect more efficient removal of entrained solids from the gas and to avoid wetting the filter equipment.

The quench liquid introduced into line 10 through line 24 usually contains carbonate(s) and some of the sulfur salts produced in scrubber C, the operation of which is further described below. As the quench liquid from line 24 contacts the waste gas in line 10, the carbonate(s) react with some of the sulfur dioxide in the waste gas and convert it to sulfur salts. Upon contact with the hot waste gas, water in the quench liquid stream evaporates, leaving the alkali metal sulfur salts suspended in the waste gas. As the waste gas passes through filtration system B the suspended particles are filtered out of the gas. The filtered particles are continuously or periodically removed from filtration system B and recycled to furnace A by means of a conveyor belt or other suitable means, which means is represented in FIG. 1 by line 16. Recycling the particulate material captured in filtration system B to furnace A provides two benefits: firstly, it prevents pollution of the environment, and secondly, it improves the economics of the process since sulfur salts are among the ingredients of the glass formulation.

The filtered waste gas exits filtration system B through line 14 and next enters scrubber C, wherein it is contacted with aqueous carbonate solution, which enters scrubber C through line 18. The concentration of carbonate in the scrubber solution is such that the average pH of the liquid in scrubber C is maintained in the range of about 6.5 to 8.0 As the waste gas passes through scrubber C substantially all of the sulfur dioxide in the gas reacts with the carbonate to form sulfur salts. Additionally, the waste gas is cooled, usually to a temperature of less than about 50° C., during the scrubbing process; consequently most of the moisture is condensed out of the gas. Thus, the scrubbed waste gas, which leaves scrubber C through line 20, is substantially free of sulfur dioxide and contains only a small amount of moisture.

To ensure substantially complete removal of all sulfur dioxide in the waste gas, the scrubbing solution entering scrubber C through line 18 carries with it a stoichiometric excess of carbonate, relative to the concentration of sulfur dioxide in the waste gas stream. The used aqueous scrubbing solution, now containing the sulfur salts and excess carbonate, leaves scrubber C through line 22. Part of the liquid effluent from the scrubber passes through line 24 for use as quench liquid, as described above, and the remainder enters line 26. In a preferred aspect of this embodiment of the invention, part of the liquid passing through lines 26 is recycled to scrubber C via line 18, and the remainder is discharged from the system through line 28. Discharge of excess aqueous solution through line 28 serves the purpose of removing most of the water formed in furnace A during the combustion step.

By virtue of the combined quench, filtration and scrubbing steps, substantially all of the $SO_2$ and particulate solids and most of the water are removed from the furnace waste gas stream, and the stream exiting scrubber C through line 20 is highly concentrated in carbon dioxide, but contains small amounts of $NO_x$, uncombusted hydrocarbon fuel and inert gases. The next step of the process of the invention is the removal of $NO_x$ from the waste gas.

The gas stream in line 20 is heated by, for instance, heat exchangers or other heating equipment (not shown), to a temperature in the range of about 350 to about 500° C., and the heated gas is introduced into the first chamber of selective catalytic reduction system D. As the gas passes through chamber 30 some of the $NO_x$ contained therein is converted to nitrogen by reaction with the ammonia entering the chamber via line 36. The ammonia entering system D may be in the form of anhydrous ammonia or aqueous ammonium hydroxide solution. During the course of its passage through chamber 30 the gas is cooled, and it exits chamber 30 at a temperature in the range of about 300 to about 400° C. The gas then enters chamber 32 wherein additional $NO_x$ reacts with ammonia freshly introduced into chamber 32 through line 38. The gas is further cooled as it passes through chamber 32, and it exits this chamber at a temperature in the range of about 250 to about 350° C. Finally, the waste gas enters chamber 34 and therein additional $NO_x$ in the gas reacts with the ammonia entering chamber 34 via line 40, to produce nitrogen. If desired, part of the gas feed in line 20 may be combined with the ammonia being introduced into unit D through lines 36, 38 and 40. This improves the dispersion of ammonia in the reactor chambers.

It has been determined that the efficiency of the selective catalytic reduction reaction depends upon the temperature at which the reaction takes place and the molar ratio of ammonia to total nitrogen oxides in the reaction zone, i.e. the molar ratio of ammonia entering the reactor to total nitrogen oxides in the waste gas entering the reactor, and that as the temperature decreases, the molar ratio of ammonia to total nitrogen oxides in the reaction zone should be increased to maintain the reaction conditions in the optimum range. As used herein, the molar ratio of ammonia to total nitrogen oxides in a reaction zone is the molar ratio of ammonia entering the reaction zone to total nitrogen oxides entering the reaction zone, including the nitrogen oxides that are in any waste gas that is mixed with the ammonia prior to introduction of the ammonia into the reaction zone. It has been further determined that at a reaction temperature in the range of about 350 to about 500° C., the optimum molar ratio of ammonia to total nitrogen oxides in the reaction zone is about 0.5 to about 1.1; at a reaction temperature in the range of about 300 to about 400° C., the optimum molar ratio of ammonia to total nitrogen oxides in the reaction zone is in the range of about 0.75 to about 1.5; and at a reaction temperature in the range of about 250 to about 350° C., the optimum molar ratio of ammonia to total nitrogen oxides in the reaction zone is in the range of about 1.0 to about 2.0. Thus, in the most efficient operation of the multiple-chamber selective catalytic reduction system used in the process of the invention, the ratio of ammonia to $NO_x$ is increased as the temperature decreases during passage of the waste gas from chamber to chamber in the system. The above-stated reaction conditions are preferred for the sake of reaction efficiency, but they are not critical to the success of this part of the process of the invention.

The gas stream leaving selective catalytic reduction system D through line 42 contains no more than trace amounts of sulfur compounds and $NO_x$. The remaining impurities are easily separable from carbon dioxide by distillation. This gas stream is cooled by, for example, passage through a heat exchanger (not shown) and dried to remove moisture therefrom. It is compressed and can be dried by any of the well-known methods, such as by passage through an adsorption unit containing a desiccant (not shown). It is then cooled, thus causing carbon dioxide in the stream to partially condense. The liquid-gas mixture is then introduced into unit E, wherein it is fractionated into a substantially pure liquid carbon dioxide product and an overhead vent stream. The liquid carbon dioxide stream, which generally has not more than about 5 ppm $NO_x$ and not more than about 1 ppm sulfur compounds is discharged from unit E through line 44, and the overhead stream leaves this unit via line 46. The overhead stream, which contains considerable amounts of unconsumed fuel is partly recycled to furnace A through lines 46 and 2 for use as fuel. A small amount of this stream can be continuously or periodically vented from the system through line 48 to prevent the buildup in the system of components such as nitrogen and argon. The vent stream can be sent to flare or to other gas disposal equipment.

The process of the invention practiced in the system of FIG. 2 is the same as the process practiced in the system of FIG. 1, but with minor modifications. In the process practiced in the FIG. 2 system, a small part of the fuel introduced into the system through line 2 is shunted to line 10 via furnace bypass line 50. The purpose of this feature is to create a reducing atmosphere in line 10 to convert some of the $NO_x$ produced in furnace A to nitrogen, thereby reducing the burden on selective catalytic reducing system D. The system of FIG. 2 also illustrates the heating up of the feed in line 20 to system D by heat exchanging the feed with the effluent flowing through line 52 from the last reaction chamber of system D in heat exchange means F. The heat exchange also serves to cool the feed to distillation unit E. The above-described features of FIG. 2 can be used in any of the embodiments of the invention.

The process practiced in the embodiment shown in FIG. 3 is likewise the same as that of FIG. 1, except that the scrubbed gas exiting scrubber C through line 20 is heat exchanged in heat exchanger G with the hot waste gas leaving furnace A through line 10. This feature serves the purposes of partly cooling the hot waste gas, thus reducing the amount of quench liquid that must be introduced into the gas through line 24, and heating the gas to the temperature at which the reaction in system D is desirably carried out. As noted above, heat exchanger G may be used in combination with heat exchanger F of FIG. 2 to heat the gas feed to system D.

The invention may include other embodiments that are not illustrated in the drawings. For example, the hot furnace gas in line 10 can be use to preheat some or all of the feed streams entering furnace A, including the fuel passing through lines 2 and 46, the oxidant passing through line 4 and the glass batch materials entering the system through line 6.

It will be appreciated that it is within the scope of the present invention to utilize conventional equipment to monitor and automatically regulate the flow of gases within the system so that it can be fully automated to run continuously in an efficient manner.

Although the invention has been described with particular reference to specific equipment arrangements, etc., these features are merely exemplary of the invention and variations are contemplated. For example, purification of the gas stream exiting system D of the drawings may be effected by procedures other than distillation, such as absorption of the carbon dioxide with a solvent, such as an ethanolamine, adsorption, membrane separation, and combinations of any of these. The scope of the invention is limited only by the breadth of the appended claims.

What is claimed is:

1. A process for recovering carbon dioxide from a feed gas containing carbon dioxide and nitrogen oxides comprising contacting the feed gas with ammonia and a catalyst selected from the group consisting of vanadium, titanium, tungsten, zeolites, platinum, palladium, rhodium, ruthenium, osmium, iridium and mixtures thereof in a selective catalytic reduction zone comprising a series of at least two reactors, with ammonia being introduced into the feed gas entering or in each reactor and converting nitrogen oxides in said feed gas to nitrogen, the waste gas temperature decreasing as the waste gas passes from reactor to reactor, the molar ratio of ammonia to total nitrogen oxides in the waste gas increasing as the waste gas passes from reactor to reactor.

2. The process of claim 1, wherein said selective catalytic reduction zone comprises a series of two reactors, the molar ratio of ammonia to total nitrogen oxides in the waste gas in the first reactor being in the range of about 0.5 to about 1.1, and the temperature of this gas being in the range of about 350 to about 500° C.; and the molar ratio of ammonia to total nitrogen oxides in the waste gas in the second reactor being in the range of about 0.75 to about 2.0, and the temperature of this gas being in the range of about 250 to about 400° C.

3. The process of claim 1, wherein said selective catalytic reduction zone comprises a series of three reactors, the molar ratio of ammonia to total nitrogen oxides in the waste gas in the first reactor being in the range of about 0.5 to about 1.1, and the temperature of this gas being in the range of about 350 to about 500° C.; the molar ratio of ammonia to total nitrogen oxides in the waste gas in the second reactor being in the range of about 0.75 to about 1.5, and the temperature of this gas being in the range of about 300 to about 400° C.; and the molar ratio of ammonia to total nitrogen oxides in the third reactor being in the range of about 1.0 to about 2.0, and the temperature of this gas being in the range of about 250 to about 350° C.

\* \* \* \* \*